Patented Apr. 17, 1945

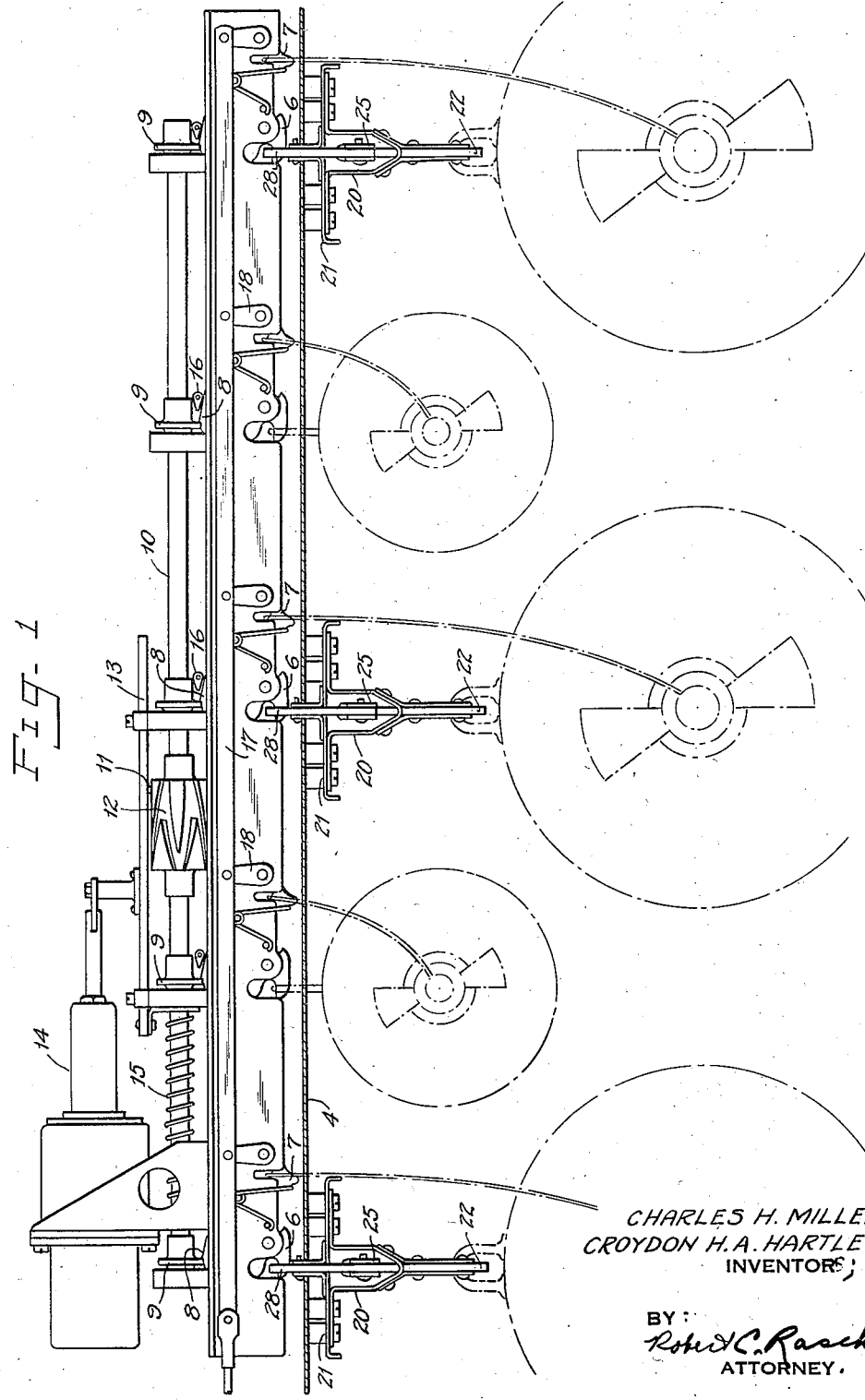

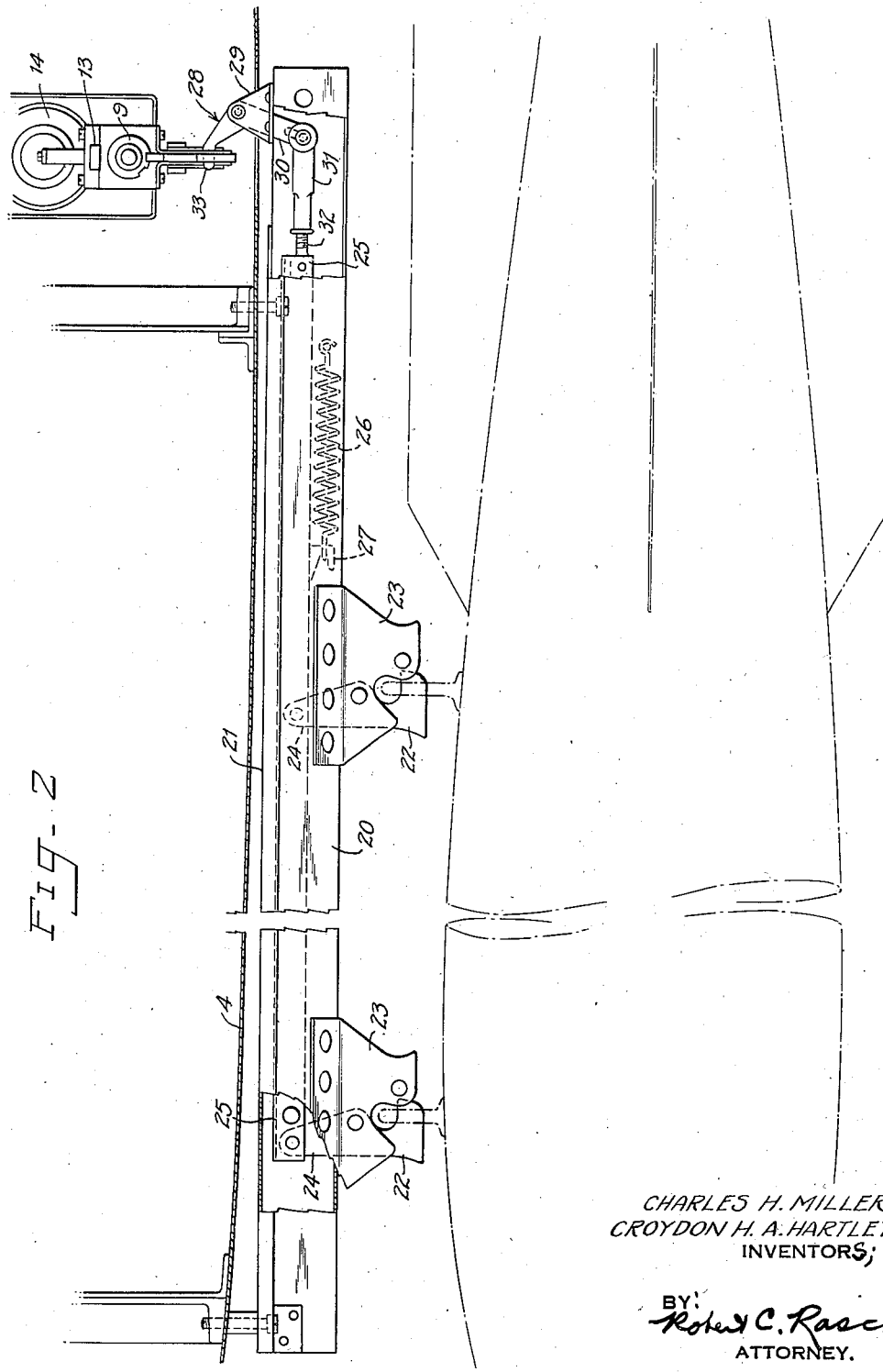

2,373,904

UNITED STATES PATENT OFFICE 2,373,904

AIRCRAFT ARMAMENT

Charles H. Miller, Amityville, and Croydon H. A. Hartley, Garden City, N. Y., assignors to Republic Aviation Corporation, a corporation of Delaware Application October 10, 1940, Serial No. 360,554

9 Claims. (Cl. 89—1.5)

This invention relates to aircraft armament and more particularly to bomb discharging equipment for airplanes.

The bombing equipment of military airplanes, to which the present invention pertains, usually includes bomb racks having a capacity of, say, five relatively small bombs, the rack having operating mechanism for discharging the bombs either in salvo or one after the other and are provided with a device for retaining or releasing the safety wire of the bomb depending on whether the bomb is to be discharged in "safe" or "armed" condition.

One of the objects of the present invention is to provide auxiliary equipment by which the conventional bomb rack is rendered capable of discharging bombs of materially greater size and weight than those for which the bomb rack was originally intended.

Another object is to provide a bomb rack adaptor for association with, and operation by, the usual bomb rack, by which same is rendered capable of handling both large and small bombs without necessitating any changes in the usual rack arrangement or its operating mechanism.

In its more specific aspect the invention provides a bomb rack adaptor having a capacity materially greater than the usual bomb rack, adapted for operative association with the usual bomb rack in such manner that the several bombs carried by a series of these adaptors may be discharged one at a time or in salvo, as well as in the "safe" or "armed" condition, these various modes of operation being effective by the conventional operating mechanism of the usual bomb rack.

Other objects and advantages will be hereinafter manifest.

In the drawings:

Fig. 1 is a fragmentary spanwise sectional view of an airplane wing illustrating in end elevation several of the bomb rack adapters forming the subject matter of the present invention in operative association with the conventional bomb rack, and operating mechanism housed within the wing of the airplane; and Fig. 2 is a fragmentary transverse section through the wing of an aircraft illustrating the bomb rack adapter of the present invention in elevation with parts broken away.

The arrangement and operating mechanism of the conventional bomb rack shown is substantially similar to that shown and described in Patent No. 2,278,482 granted April 7, 1942 to A. M. Pishvanov from co-pending application Serial Number 210,628, filed May 28, 1938. This bomb rack includes an elongate frame mounted interiorly of the wing structure 4, the frame having a series of bomb stations each including a bomb supporting hook 6 and a safety catch 7 pivoted on the frame, arranged at intervals therealong ample to accommodate relatively small bombs. Each hook 6 has a sear 8 normally holding the hook in cocked position, with the sear engaged against a notched disk 9. As the disk 9 is rotated, its notch becomes aligned with the sear 8 thereby releasing the hook 6 to drop the bomb. The disks 9 are carried on a rotatable shaft 10 which is rotated a predetermined angular distance by reciprocation of a cam follower 11 in cooperation with a cam drum 12. The follower 11 is guided in its reciprocatory movement by a slide bar 13, the latter being actuated by a solenoid 14 and a restoring spring 15. By suitably orienting notches of the disks 9 about the shaft 10, any desired order of operation of the bomb stations may be had. Each time the solenoid 14 is energized, the resultant reciprocation of the follower 11 cooperating with the cam 12, rotates the shaft 10 to release the bomb at one of the stations, the series of bombs being thus discharged one after another by successive operations of the solenoid.

All of the bombs may be dropped in salvo by a mechanism including a lever 16 at each bomb station adapted to actuate the sear 8 to move same free of the disk 9. The levers 16 of all stations are operated simultaneously by a bar, not shown, extending along the frame, to which bar each lever is operatively connected.

The safety catch 7 at each station is normally locked so as to retain the safety wire of the bomb and thus discharge the bomb in "armed" condition by pulling the safety pin from the bomb as same is dropped. With the safety catch unlocked, the bomb is discharged in "safe" or "unarmed" condition by releasing the safety wire as the bomb is dropped. The locking or unlocking of the catch 7 is effected by a pivoted dog, not shown, which may be swung into or out of locking engagement with the catch by actuating a bar 17 connected to the dog at each station by an arm 18.

The structure and mechanism outlined in the foregoing description constitutes the bomb rack, per se, which forms the subject matter of said Pishvanov Patent Number 2,278,482. This bomb rack is illustrated by way of example only, to set forth the association and cooperation therewith of the bomb rack adaptor of the invention.

The adaptor comprises an elongate frame 20, preferably of channel or tubular form having laterally projecting flanges 21 which are secured to the bottom of the wing structure 4. It may be here noted that the conventional bomb rack is usually mounted spanwise of the wing, holding the series of bombs in a row along the wing, each bomb having only one loop engaging the hook of its bomb station with the bomb axis fore-and-aft of the airplane. The bomb rack adaptor, however, is arranged chordwise of the wing or at right angles to the bomb rack. This arrangement of the adaptor is desired in order to accommodate two holding loops usually required on bombs of larger size, the greater length of which requires support at more than one point. It will be noted, however, that in the instance where the larger bomb requires only one point of support, other arrangements of the adaptor in relation to the bomb rack may be had, if desired.

The mechanism of the adaptor for holding and releasing a bomb includes one or more hooks 22 pivoted on bracket plates 23 secured to the frame channel 20. Each hook 22 has an arm 24 extending upwardly into the channel frame 20 and articulated to an elongate bar 25 extending substantially through the channel frame 20. A spring 26, anchored at one end to the frame 20 and engaging a member 27 on the bar 25, constitutes means by which the hooks 22 are urged to bomb-releasing position. At a point along the adaptor adjacent which the bomb rack is disposed, a bellcrank 28 is provided, the same being pivoted on brackets 29 carried on the frame 20. The bellcrank 28 includes a depending arm 30 operatively connected to the bar 25 by a pin-and-slot connection and a clevis 31 threadedly engaging a screw 32 on the bar.

The bellcrank 28 has a second arm 33, the end of which is adapted to engage the hook 6 of the bomb rack, the bellcrank 28 and associated bar 25 constituting an operative connection between the bomb rack hook 6 and the adaptor hooks 22. It will be noted that the bellcrank 28 may be articulated to the bar 25 at any desired point along the bar, which feature affords latitude as to the relative positions of the bomb rack and adaptor.

As shown in Figure 2, the loop of the large bomb engages the hook 22 at a point only slightly offset horizontally from the hook pivot so that, although the weight of the bomb tends to swing the hook to release position, only a light force is required to maintain the hook in bomb-holding position. Although the spring 26 assists in releasing the bomb, its primary purpose is to hold the mechanism in released position after discharging the bombs. As previously described, the weight of the bomb acting on the hooks 22 tends to swing same to released position. This tendency is counteracted by the bellcrank 28 in engagement with the hook 6 of the bomb rack. As the hook 6 is released, the bellcrank 28 is freed and thus releases each of the adaptor hooks 22 simultaneously through the medium of the connecting bar 25.

A salient feature of the adaptor release mechanism resides in the fact that the load imparted to the bomb rack hook 6 by the weight of the larger bomb is substantially equivalent to the weight of a small bomb only, this being due primarily to the relation of the pivot of hook 22 with the portion of the hook engaging the bomb loop, as previously described. This is an important advantage in that the increased weight of the larger bomb does not increase the work of the solenoid and associated mechanism and thus assures dependable operation of the bomb rack, whether using the large or small bombs. A further advantage is had by the adaptability of the safety catches 7 of the bomb rack for use with larger bombs as well as the smaller ones, thus eliminating the necessity of safety catches in the mechanism of the adaptor.

It will be seen that the adaptor of the invention, in operative association with the conventional bomb rack, materially increases the capacity of the airplane's bombing equipment, making same capable of handling a number of much larger bombs as well as the small bombs, as desired. Conversion of the bombing equipment from one size of bomb to the other may be easily effected by removing or installing the adaptor as a unit, without requiring any changes whatsoever to the bomb rack. When the bombing equipment is armed with both sizes of bombs, as shown in Figure 1, it is desired that the notches of the disks 9 be so oriented about the shaft 10 that the bomb stations, numbers two and four, be operated last, in order that the larger bombs be out of the way before the smaller bombs carried between each pair of larger bombs are released, in the instance where the bombs are dropped selectively or in train.

Having now made certain the nature and purposes of our invention, and at least one mode of executing same, in such manner as to enable anyone skilled in the art to which it appertains, to make and use same, as required by the statutes, that which we claim as our property, and desire to secure by Letters Patent of the United States, is:

1. A bomb rack adaptor for use in conjunction with an airplane bomb rack of the type entirely lodged in the interior of the wing of the airplane and having a series of hooks for relatively small bombs suspended spanwise along an elongate frame and a manually controlled operating mechanism adapted to release these bombs in determined order and in either safe or armed condition, said adaptor comprising an elongate channel frame secured chordwise to the bottom of the wing structure below an empty hook of the rack, a pair of auxiliary hooks pivoted to said frame with the bomb-engaging point of each hook but slightly offset horizontally from the pivot point of said hook and normally remaining in closed position to carry thereby a relatively large bomb of a weight sufficient to open said hooks each of these auxiliary hooks having an arm projecting upwards within the channel frame, a bar connecting said arms and slidable within the channel frame, and a trigger pivoted above said channel frame near said empty hook, said trigger having a downwardly-projecting arm articulated to said bar and an upwardly-projecting arm engageable into said empty hook so as to establish an operative connection between said bar and said empty hook, said members being thus organized, together with the releasing-mechanism in such manner that releasing movement of the release-mechanism of the small-bomb rack effectuates the movement of said connections to thereby release said large bomb.

2. In bombing equipment for airplanes in which a flush type bomb rack is arranged interiorly of the airplane's lower covering, the bomb rack having a series of hooks for relatively small bombs and an operating mechanism to release these bombs in determined order and condition: at least one adaptor for a relatively large bomb, comprising an elongated hollow frame attachable exteriorly of the airplane's lower covering, a pair of auxiliary hooks pivoted on said frame, a bar slidable within this frame and connecting said auxiliary hooks for movement in unison, a spring urging this bar to open these auxiliary hooks, and a trigger pivoted on said frame, articulated to said bar, and extending upwardly through the airplane's lower covering for engagement with an empty hook of the bomb rack, this trigger being arranged and organized to positively hold this bar in active position against the action of this spring when thus engaged as long as this empty hook remains closed, whereby discharge of the large bomb is controlled by the bomb rack operating mechanism through the opening operation of this empty hook.

3. For use with a bombing rack that includes a plurality of normally-closed suspension hooks adapted to be opened to discharge a series of small bombs and manually controlled releasing means adapted to open said hooks either individually, in salvo, or in train: an adaptor allowing substitution of a bomb of substantially heavier caliber for one small bomb of said series without entailing any change whatever in said rack; said adaptor comprising: a frame attachable to the rack; at least one auxiliary suspension hook pivoted to said frame and constructed for carrying the substituted heavier bomb; locking means, normally held in active position by the empty hook of the rack, for holding said auxiliary suspension hook in its closed position to thereby support said large bomb and organized therewith to be indirectly controllable by said manually controlled releasing means; and means for adjusting the load applied by said locking means upon said empty hook to substantially correspond to the predetermined weight of the omitted small bomb.

4. An adaptor, for use with a bomb-rack of the kind having a series of hook for relatively-small bombs and having operating mechanism for releasing same in predetermined order, comprising: a frame for cooperation with said rack and designed to be mounted on an aircraft below said rack; at least one auxiliary hook pivoted to said frame under said rack for carrying a bomb substantially-larger than said small bombs; locking means cooperative with an empty hook of said rack for normally holding said auxiliary hook closed to hold said large bomb in place; and means for adjusting the operative connection between said auxiliary hook and said corresponding empty hook of the rack to thereby effectuate the release of said large bomb by actuation of the bomb-rack operating mechanism, in the same manner as the release of the small bomb for which the large bomb is substituted.

5. A bomb rack adaptor for use in conjunction with an airplane bomb rack having a series of normally closed hooks for relatively small bombs and an operating mechanism adapted to release these bombs by opening of these hooks in determined order and condition, said adaptor comprising an elongate frame, a pair of bomb-supporting hooks pivoted along said frame with their bomb-engaging points offset but slightly horizontally from said pivot points for carrying a relatively large bomb, said frame including means for normally holding said hooks closed against the tendency of the weight of the large bomb to open same, a bar connecting said hooks for operation in unison, and a trigger pivoted upon said frame and engaging said bar and said bomb rack to set up forces normally restraining all movement of said bar, said trigger having an arm articulated to one end of said bar and an upwardly projecting second arm engaged into a closed, empty hook of the bomb rack and thereby setting up forces restraining movement of said trigger to normally hold same stationary, said engagement when complete, consequently setting up forces retaining the large bomb in place, and means for applying releasing force through the release mechanism of the bomb rack to discontinue the engagement and release said large bomb.

6. The combination with an aircraft structure, of a bomb rack mounted thereon having a series of suspending devices each to support a bomb in a predetermined position with respect to the aircraft structure and movable to release the supported bomb, means for retaining said devices in bomb supporting position, means for releasing said retaining means to effect the release of the supported bombs, an adapter attached to the aircraft structure to cooperate with one of said devices, suspending means incorporated in said adapter to releasably support a bomb in a position other than that predetermined for the bombs supported by said devices, and means whereby the release of the device cooperating with the adapter also effects the release of the suspending means of the latter to release the bomb supported thereby.

7. The combination of a bomb rack having means adapted to occupy a closed position and an open position and organized in their closed position to support bombs suspended therefrom, and means for holding said bomb suspending means in their closed position, the spacing of the bomb suspending means being such that the rack will receive and hold bombs of only a predetermined size, and said bomb rack including releasing mechanisms organized with said suspending means to release the same for travel from their closed position to their open position; with a frame designed to be mounted adjacent said bomb rack and including means for releasably suspending therefrom a bomb exceeding in size said predetermined size, and operative connections between said suspending means on said frame and the cooperating suspending means on said rack, said connections being organized with both of said suspending means so as to release said larger bomb by the mere operation of the release mechanism for the smaller bomb suspending means in the bomb rack.

8. The combination of a bomb rack having a plurality of means adapted to occupy closed positions and open positions and organized in their closed positions to support bombs of a predetermined size suspended therefrom, and releasing mechanisms incorporated in said bomb rack organized with said suspending means to release the same for travel from their closed positions to their open positions, a plurality of frames designed to be mounted adjacent said bomb rack and each cooperating with an empty suspending means of said bomb rack, means for releasably suspending to each frame a bomb exceeding in size said predetermined size, and operative connections between said suspending means on each frame and the associated suspending means on said rack, so organized with both of said suspending means to release the larger bomb in response to the release of said first-named releasing mechanism, means being incorporated in said frame to effectuate said release by only the same magnitude of force and movement of the smaller bomb releasing mechanism as is necessary to release one of said smaller bombs.

9. The combination with an aircraft structure, of a bomb rack for a series of aligned bomb suspending devices attached to said structure, each capable of movement from a bomb supporting position to a bomb releasing position, separate means for holding the individual devices in bomb supporting positions, a series of aligned adapters of less number than the aforesaid bomb suspending devices mounted on said structure in a plane separated from and parallel to the plane of said devices, the arrangement being such that each adapter is disposed adjacent one of said devices and the bomb suspending devices, not associated with an adapter, can each be utilized to support a bomb, bomb suspending means incorporated in each of said adapters movable to release a bomb supported thereby, and means in each adapter for holding the bomb suspending means of such mechanism in bomb supporting position and arranged to be released by the release of the adjacent bomb suspending device of the bomb rack.

CHARLES H. MILLER.
CROYDON H. A. HARTLEY.